United States Patent

[11] 3,631,603

[72] Inventors: Robert Gordon Munro, Huddersfield; Rodney Barker Hale, Watford, both of England
[21] Appl. No.: 824,242
[22] Filed: May 13, 1969
[45] Patented: Jan. 4, 1972
[73] Assignee: J. Goulder & Sons Limited, Kirkheaton, Huddersfield, England
[32] Priority: June 13, 1968
[33] Great Britain
[31] 28,112/68

[54] METHOD AND APPARATUS FOR MEASURING PROFILE AND LEAD ERRORS IN GEAR TEETH
6 Claims, 3 Drawing Figs.

[52] U.S. Cl. ................................................ 33/179.5, 33/174 P
[51] Int. Cl. ................................................ G01b 7/28, G01b 19/20
[50] Field of Search ........................................ 33/179.5, 179.55

[56] References Cited
UNITED STATES PATENTS
3,237,442  3/1966  De Vos ............... 33/179.5

Primary Examiner—Leonard Forman
Assistant Examiner—Paul G. Foldes
Attorney—Young & Thompson ABSTRACT: In a method of measuring errors in the flanked surfaces of the teeth of a gearwheel, the gearwheel is mounted freely rotatable. A probe is arranged to contact the flanked surface to be measured whereby the gearwheel can rotate in response to a movement of the probe which causes relative movement of the probe over said surface in a required direction. To test the flanked surface, the probe is moved in said direction by a predetermined amount, and the resulting rotation of the gearwheel is measured. The expected amount of rotation of the gearwheel for movement of the probe can be determined for the design tooth shape. Comparison of the actual amount with the expected amount of gearwheel rotation indicates the error in the flanked surface of the tooth.

PATENTED JAN 4 1972

Inventors
ROBERT GORDON MUNRO
RODNEY BARKER HALE

By *Young r Thompson*
Attorneys

METHOD AND APPARATUS FOR MEASURING PROFILE AND LEAD ERRORS IN GEAR TEETH

This invention relates to a method and apparatus for measuring errors in the flanker surfaces of members, particularly the flanked surfaces of gear teeth on a gear wheel.

In one known method of measuring involute errors in the tooth flank of a gearwheel, an accurately finished base disk is mounted concentric and rotatable with the gearwheel. The base disk is brought into contact with a straightedge, and a stylus located precisely over the straightedge simultaneously engages a tooth flank of the gearwheel. The base disk is rolled along the straightedge, and the path of motion of the flank relative to the stationary stylus will be that of a true involute, if the tooth profile is correct: and the stylus will be undeflected. However if errors are present in the tooth profile, the stylus will be deflected; and the stylus is connected to a recorder producing a trace showing these errors relative to a datum. In an alternative arrangement, the straightedge (and stylus) is moved transversely to rotate the disk and gearwheel: the formation of the error trace is as before. A disadvantage of this arrangement is that different base disks are required for gearwheels of different diameter.

To overcome this disadvantage, tooth profile-measuring machines have been introduced which can be set to desired base circle radius values. These machines again include a measuring stylus and embody some form of mechanical linkage device, such as for example an adjustable sine bar, to cater for gearwheels of different dimensions; tooth checking in these machines is similar as in fixed base disk machines and is again such that when no tooth involute error is present the stylus remains undeflected. However, the required setting of the linkage device in these machines requires precision and is time consuming. Also, friction and wear can occur in the mechanical devices used in both these prior machines and this will result in measuring errors.

In one aspect of the present invention a method for measuring errors in the tooth flank of a toothed member comprising positioning a probe member and the measured member such that the probe member contacts the tooth flank, mounting the probe and toothed members such that movement of one from a fixed datum in a direction to cause relative movement of the probe member over the tooth flank in a required direction results in a directly dependent movement of the other from the same fixed datum by virtue of engagement of the probe member with the tooth flank, moving said one member from the fixed datum by a predetermined amount in said direction to cause relative movement of the probe member over said tooth flank in the required direction, measuring the movement of said other member from the same fixed datum resulting from the predetermined movement of said one member, and comparing the resulting movement of said other member with a desired value for said predetermined movement of said one member from the same fixed datum.

According to another aspect of the present invention apparatus for measuring errors in the tooth flank of a gear member includes support means on which the toothed member is movably mounted; a probe member mounted on a guideway to be movable in a given direction into engagement with the tooth flank to be measured, the members being mounted such that the movement of one from a fixed datum results in a directly dependent movement of the other from the same datum by virtue of engagement between the tooth flank and the probe member, a first transducer device for measuring the movement of one of the members from the fixed datum in a direction which causes relative movement of the probe member over the tooth flank in a predetermined direction, a second transducer device for measuring the dependent movement of the other member from the same fixed datum, the transducer devices producing signals proportional to the movements of the members, and comparator means for comparing the signal produced by the second transducer device for a given movement of the one member from the fixed datum, with the desired signal to be produced by the second transducer device for said given movement of the one member.

Thus an essential feature of the present invention is that the probe member is deliberately displaced during tooth measuring, as distinct from the prior arrangements wherein probe (or stylus) displacement occurs only if an error is present in the tooth; and in a preferred arrangement of the present invention, gear movement is indeed dependent on the movement of the probe member. The displacement of the probe in the present invention will be relatively large in comparison with the error displacements of the stylii in the prior machines.

The dependent movement of one of the probe member or gear member through a given movement of the other member is compared with a desired value by comparator means which can suitably be in the form of electric circuits: and the present invention is conveniently applicable to gears of different dimensions by simple adjustment of the comparator means, for example by adjustment of the electric circuits. Also, in the present invention, the only frictional contact in the apparatus need be between the probe and gear members so that measuring errors due to wear can be substantially reduced. The accuracy of measuring utilizing the present invention can be of a considerably higher order than in the prior measuring arrangement.

Preferably the toothed member is in the form of a gearwheel, the flanked surface of a tooth of which has to be measured, mounting means are provided in which the gearwheel is mounted freely rotatable, the probe is movably mounted in a guideway arranged such that the probe can be brought into engagement with the tooth surface to be measured, and the measuring means are constituted by transducers adapted to give output signals proportional to the linear movement of the probe member and the rotation of the gearwheel respectively.

Preferably the comparator means includes a pair of electrical circuits on the output side of an electrical transformer forming an electrical bridge network, each circuit being connected across a predetermined section of the transformer and including a respective one of the transducers, and means are provided for indicating the difference of currents flowing in the circuits, the value indicated being a measure of the error in the tooth surface.

An embodiment of the present invention will now be described by way of example with reference to the accompanying drawings in which.

Figure 1:
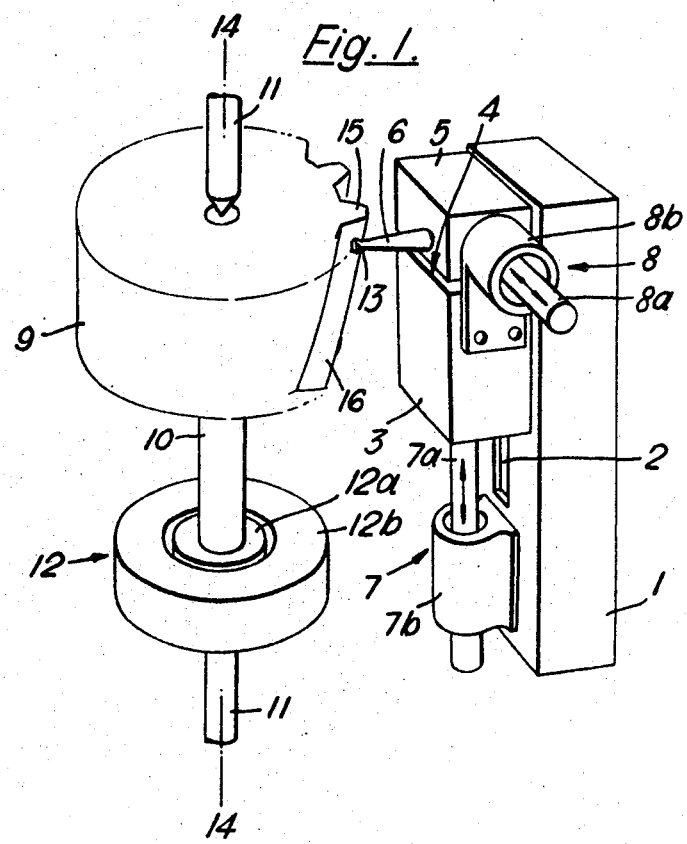
FIG. 1 shows a pictorial view of gear tooth measuring apparatus according to the present invention.

Referring to the drawings, apparatus (FIG. 1) for measuring the errors in the flanked surface of gearwheel teeth includes an upstanding column 1 having a vertical guideway 2 thereon, and a slide 3 movable on the vertical guideway 2. On an upper horizontal end face 4 of the slide 3, a horizontal guideway (not shown) is provided transverse to the vertical guideway 2. A cross-slide 5 is movably mounted on the horizontal guideway and has a probe or anvil 6 projecting in a direction normal to the vertical guideway 2. Subtending from the slide 3 is a first element 7a of a vertically arranged variable-area capacitance-type transducer 7 parallel with the guideway 2, the other cooperating element 7b of the transducer 7 being fixedly attached to the column 1; and the cross-slide carries a first element 8a of a further variable-area capacitance-type transducer 8 transverse to the transducer 7 the other cooperating element 8b of the transverse transducer 8 being bolted to the first slide 3.

The gearwheel 9 and a shaft 10 rotatively movable therewith are pivotally mounted in vertically disposed bearings 11, and the shaft 10 carries a first element 12a of an angular transducer 12 of the variable-area capacitance type, the other cooperating element 12b of the angular transducer 12 being fixed. The vertical guideway 2 of the column 1 and the axis 14—14 of rotation of the gearwheel 9 are parallel. The nose 13 of the probe 6 is provided with a knife edge.

The column 1 is movably mounted on support means (not shown) whereby the nose 13 of the probe 6 can be brought into engagement with any part of the flanked surface 16 of the gear tooth 15; and the probe 6 can be moved on the transverse guideway tangentially to the gearwheel 9.

Figure 2:
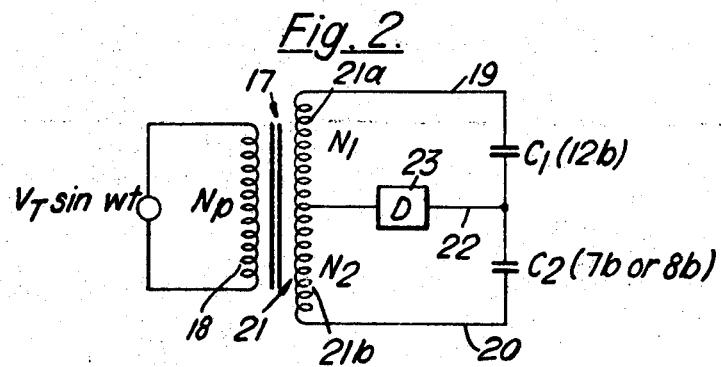
FIG. 2 shows the electrical comparator circuit associated with the apparatus of FIG. 1.

The means by which the movement of one of the slides 3, 5 and the dependent rotation of the gearwheel 9 are measured and compared is achieve by the now-described electrical network. Referring to FIG. 2, a variable-ratio transformer 17 has a sinusoidal voltage applied to its primary windings 18, while a pair of balancing circuits 19, 20 forming an electrical bridge are tapped across respective portions 21a, 21b of the secondary windings 21 of the transformer 17, one 22 of the lines connected to the tapping points being common to both circuits 19, 20. Each of the circuits 19, 20 includes a respective one 12b, 7b (or 8S) of the capacitors of the transducers 12, 7, (or 8) associated with the movements to be measured; and the common line 22 of the circuits 19, 20 includes a current-indicating device 23, the network being so arranged that when an error in the surface 16 of the gear under test is present, the device 23 indicates a current reading proportional to this error. The turns of each portion of the output windings is determined in a manner later described from a consideration of the geometry of the gear tooth. The error current value can be fed to an amplifier (not shown) to facilitate reading and the amplified reading passed to a recorder (not shown).

To use the apparatus in the measuring of a tooth surface 16 of the gearwheel 9, say for example the profile of the tooth, the surface 16 of the tooth is held in light contact against the knife-edged nose 13 of the probe 6, the probe 6 being arranged to move tangentially relative to the circumference of the gearwheel 9 and in so doing, due to the resulting rotation of the gearwheel 9, following the profile of the tooth. When it is desired to measure involute gear errors, the knife edge 13 is arranged against the tooth 15 such that the distance from the knife edge to the axis of the gear is equal to the gear base circle radius. During this test, the slide 3 is kept stationary and the movements are all effected by movement of the transverse slide 5. The appropriate capacitors, i.e., the angular 12b and transverse capacitors 8b, are set to a datum value. When the slide 5 is moved appropriately, the probe 6 moves in the aforesaid tangential manner, and in so doing moves over the tooth profile, simultaneously causing rotation of the gearwheel 9. The movements of the slide 5 and gearwheel 9 cause variation in the values of the respective capacitors 8b, 12b and proportional currents will flow in the associated electrical circuits 20, 19. If there is no error in the tooth profile, then the currents in the circuits 19, 20 will balance, and no reading will be shown on the current-detecting device 23. However, if there is an error in the profile, then the device 23 will give a current reading proportional to this error. The error current reading may be amplified and recorded.

The turns in each portion of the secondary winding can be calculated from geometry of the gear tooth as follows:

With the transducers 12, 8 (or 7) being constituted by capacitors of the variable-area plate type, the capacitance $C_1$ of the angular transducer 12 is proportional to angular movement: i.e., $C_1 = K_1\theta$. Similarly, suppose the transverse transducer 8 given an output $C_2 = K_2 x$, where $K_1$ and $K_2$ are constants.

Let the probe 6, and thus the first element 8a of the transverse transducer 8, move a distance $x$. Then the angular transducer 12 moves through an angle $\theta + \delta\theta$, where $\theta$ is the angle corresponding to a perfect gear, while $\delta\theta$ is the additional angle caused by gear error.

Then the corresponding capacitances are:

$$K_2 x \text{ and } K_1(\theta + \delta\theta)$$

With $N_1$ and $N_2$ being the turns of the portions 21a, 21b associated with the circuits of $C_1$ and $C_2$ respectively, the voltage across $C_1$ is $(N_1/N_P)\cdot V_t$, where $N_P$ is the number of turns in the primary windings 18, and the voltage across $C_2$ is $(N_2/N_P)\cdot V_t$. The corresponding currents are $$(N_1/N_P)V_T jwC_1 = (N_1/N_P)V_T jwK_1(\theta + \delta\theta).$$

where $j$ is the vectorial operator, and $$(N_2/N_P)V_T jwC_2 = (N_2/N_P)V_T jwK_2 x$$

when voltage applied to primary side $= V_T \sin \omega t$
where $\omega$ is the angular frequency of the applied voltage and $t$ is the time.

In the absence of error $\delta\theta$, the turns ratio of the variable-ratio transformer is arranged so that these two currents are equal. Hence:

$$(N_1/N_P)K_1\theta = (N_2/N_P)K_2 x \text{ or } (N_1 K_1/N_2 K_2 = x/\theta)$$

But the ratio $x/\theta$ is known from the theoretical geometry of the gear, and hence the values of $N_1$ and $N_2$ can be selected and constants $K_1$ and $K_2$ are known from the characteristics of the transducers 12, 8. In practice the values $N_1$ and $N_2$ must be integers, but they can be made such large numbers that the required ratio can easily be set to one part in a million or more.

The error current is the difference between these two currents and is $$(N_1/N_P)\cdot V_T \cdot j \cdot w \cdot k_1 \delta\theta$$

This error signal is proportional to the gear error as required, and can be amplified and recorded.

To measure the lead errors in, say, for example, a gearwheel having helically arranged teeth, the first slide 3 of the apparatus is used with the cross-slide 5 fixed. Again the surface of the tooth 15 is brought into light contact with the knife-edged nose 13 of the probe 6. Axial movement of the slide 3 causes rotation of the gearwheel 9, the capacitance values of the angular transducer 12 and axial transducers thereby being altered. The axial transducer 7 will replace the transverse transducer 8 in the electrical bridge network; but the operation of the network will be similar to the arrangement previously described.

In the apparatus hereinbefore-described, capacitance transducers and variable-ratio transformers have been used, but other arrangements could be used. For example, the transducers could be inductive or utilize optical transducers of the grating type as shown in FIG. 3.

In the case of optical transducers of the grating type, variable-ratio transformers could not be used, but the movement $x$ of one of the slides and the corresponding rotation of $\theta$ of the gear wheel could be expressed by corresponding trains of pulses, the two trains of pulses being arranged to be of the same frequency by means of frequency multiplication and division of integer values.

Figure 3:
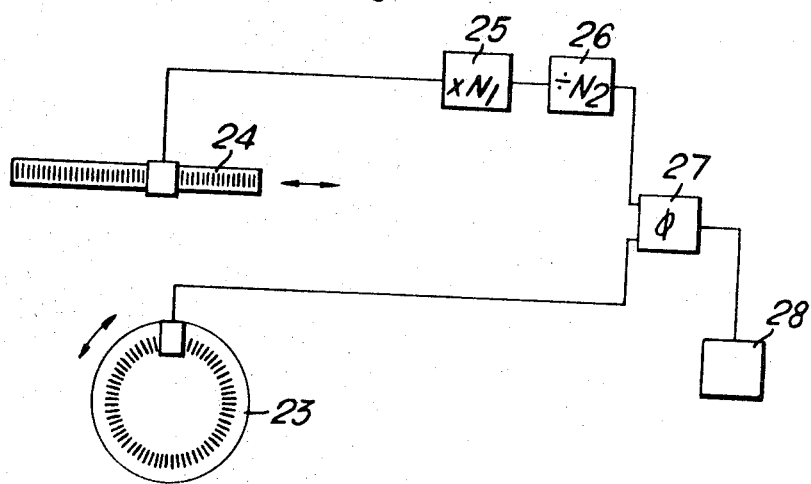
FIG. 3 shows the use of optical grating-type transducers in place of the variable-area capacitance transducers of the apparatus of FIG. 1.

For example, referring to FIG. 3, suppose the angular transducer 12 is a grating 23 having $L_1$ lines per 360°, and the linear transducer 7 or 8 is a linear grating 24 having $L_2$ lines per unit length.

If the gear rotates through an angle $\theta + \delta\theta$, as before, then the number of pulses from the angular transducer 12 is $(L_1/2\pi)(\theta + \delta\theta)$ while the number of pulses from the linear transducer 7 or 8, for a corresponding linear movement $x$ is $L_2 x$. In order to detect the error $\delta\theta$ it is necessary to first modify one of the trains of pulses, so that the two trains of pulses have the same frequency and the error 467 $\theta$ is shown up as a phase difference between the two trains. Let the train of pulses coming from the linear transducer 7 or 8 be multiplied in frequency by an integer $N_1$ by the multiplier 25 and then divided by an integer $N_2$ in the divider 26. Then the number of pulses resulting from the movement $x$ is $(L_2 N_1 x/N_2)$. It must now be arranged that $$L_1 \theta_1/2\pi = L_2 N_2 x/N_2$$

But again the ratio $x/\theta$ is known from the theoretical geometry of the gear, while $L_1$ and $L_2$ are also known, hence the values of $N_1$ and $N_2$ can be selected. As with the variable-ratio transformer method, the values of $N_1$ and $N_2$ must be integers, but they can be made such large numbers that a sufficiently close approximation can be made.

The error signal is then a phase difference corresponding to $(L_1 \delta\theta/2\pi)$.

This phase difference can be indicated by the phase comparator 27, and the value recorded by recorder 28.

Also, in the hereinbefore-described apparatus, the movement of the gearwheel 9 was the dependent movement; but it would be possible to have the movement of the probe 6 as the dependent movement; i.e., the gearwheel 9 would be rotated by the predetermined amount and the resulting movement of the probe 6 measured and compared with a desired value for the predetermined movement of the gearwheel 9. This would e a more convenient arrangement in the measurement of gearwheels having teeth with a steep helix angle.

The hereinbefore-described apparatus is useful for testing gear teeth having not only involute profiles, but also those having tapered flanks; and apparatus according to the present invention could be used for testing the gear teeth of racks rather than gearwheels Also, apparatus according to the present invention could be used for measuring the errors in the flanked surfaces of other types of engineering members, such as for example the cam surface of a cam. In the measurement of racks, the probe and the flanked surface of the rack would be arranged such that axial or transverse movement of the probe would cause a corresponding linear movement of the rack, or vice versa. In this case therefore, the rack would require to be connected to a linear transducer rather than the angular transducer of the hereinbefore described embodiment. Further, the apparatus could be arranged horizontally rather than vertically.

In previously proposed apparatus for measuring the teeth of gears, the gear was caused to move in a prescribed manner and any error was indicated by an indicator impinging on the tooth. The apparatus according to the present invention greatly simplifies the measurement of errors.

We claim:

1. Apparatus for measuring variations in the flanked surface of a flanked member including movable support means for mounting said flanked member for movement therewith; a probe movably mounted on a guideway on said apparatus to be movable in a given direction into engagement with the flanked surface to be measured, the probe member and support means being mounted such that movement of one causes a directly dependent movement of the other by virtue of engagement between the flanked surface and the probe member, a first transducer device generating first electrical signals proportional to the displacement of one of the probe member and support means in a direction which causes relative movement of the probe member over the flanked surface in a predetermined direction, a second transducer device generating second electrical signals proportional to the dependent movement of the other of the probe member and support means, and comparator means comparing said second signals with said first signals and indicating variations in said second signals relative to said first signals as a measure of said variations in said flanked surface.

2. Apparatus as claimed in claim 1, wherein the flanked member is in the form of a gearwheel, the support means are such that the gearwheel is mounted freely rotatable and the transducers are adapted to give output signals proportional to the linear displacement of the probe member and the rotation of the gearwheel respectively.

3. Apparatus as claimed in claim 1, wherein the comparator means includes a pair of electrical circuits on the output side of an electrical transformer forming an electrical bridge network, each circuit being connected across a predetermined section of the transformer and including a respective one of the transducers, and means for indicating the difference of currents flowing in the circuits, the value indicated being a measure of variation in the tooth surface.

4. Apparatus as claimed in claim 3, wherein the transducers are of the variable-area capacitance type.

5. Apparatus as claimed in claim 2, wherein the gearwheel is mounted such that its axis is vertical, and the probe member is mounted on a linear guideway.

6. Apparatus as claimed in claim 5, wherein a vertical column is provided and includes a vertical guideway for a first slide, and a second slide is mounted on a guideway on the first slide, to be movable transverse to the vertical guideway, the probe member being attached to the second slide and the transducer for the probe member being operatively associated with one or both of said slides.

* * * * *